United States Patent [19]

Whitley

[11] Patent Number: 4,771,564
[45] Date of Patent: Sep. 20, 1988

[54] FISHING ACCESSORY AND METHOD OF USE

[76] Inventor: Darryl F. Whitley, Rte. 5, Box 4199, Tallahassee, Fla. 32301

[21] Appl. No.: 766,709

[22] Filed: Aug. 19, 1985

[51] Int. Cl.$^4$ .................................................. B05C 1/06
[52] U.S. Cl. ................................................ 43/4; 43/25
[58] Field of Search ............................. 43/4, 25, 54.1

[56] References Cited

U.S. PATENT DOCUMENTS

| | | | |
|---|---|---|---|
| 2,249,327 | 7/1941 | Rairigh | 43/4 |
| 2,434,861 | 1/1948 | Pachner | 43/25 |
| 2,846,705 | 8/1958 | Marz | 43/4 |
| 3,410,018 | 11/1968 | Woolworth | 43/54.1 |
| 4,290,223 | 9/1981 | Ostenberg et al. | 43/54.1 |
| 4,501,222 | 2/1985 | Stone | 43/25 |

*Primary Examiner*—M. Jordan
*Attorney, Agent, or Firm*—James H. Beusse

[57] ABSTRACT

Apparatus for applying a fish attracting fluid to fishing tackle is disclosed. The apparatus includes a box having an upper portion with an opening including an upper segment of resilient, absorbent material attached therein. The box has a lower portion with an opening including a lower segment of resilient absorbent material attached therein. The segments are of such thickness as to contact one another when the box is closed. The box is also provided with an offset hinge pin for the proper positioning of the box portions during opening and closing. The segments are provided with a fish attracting fluid so that when the box is closed with fishing tackle therein, the fishing tackle will be coated with the fluid. Also disclosed is the method of coating fishing tackle with fish attracting fluid as through the use of such box.

2 Claims, 1 Drawing Sheet

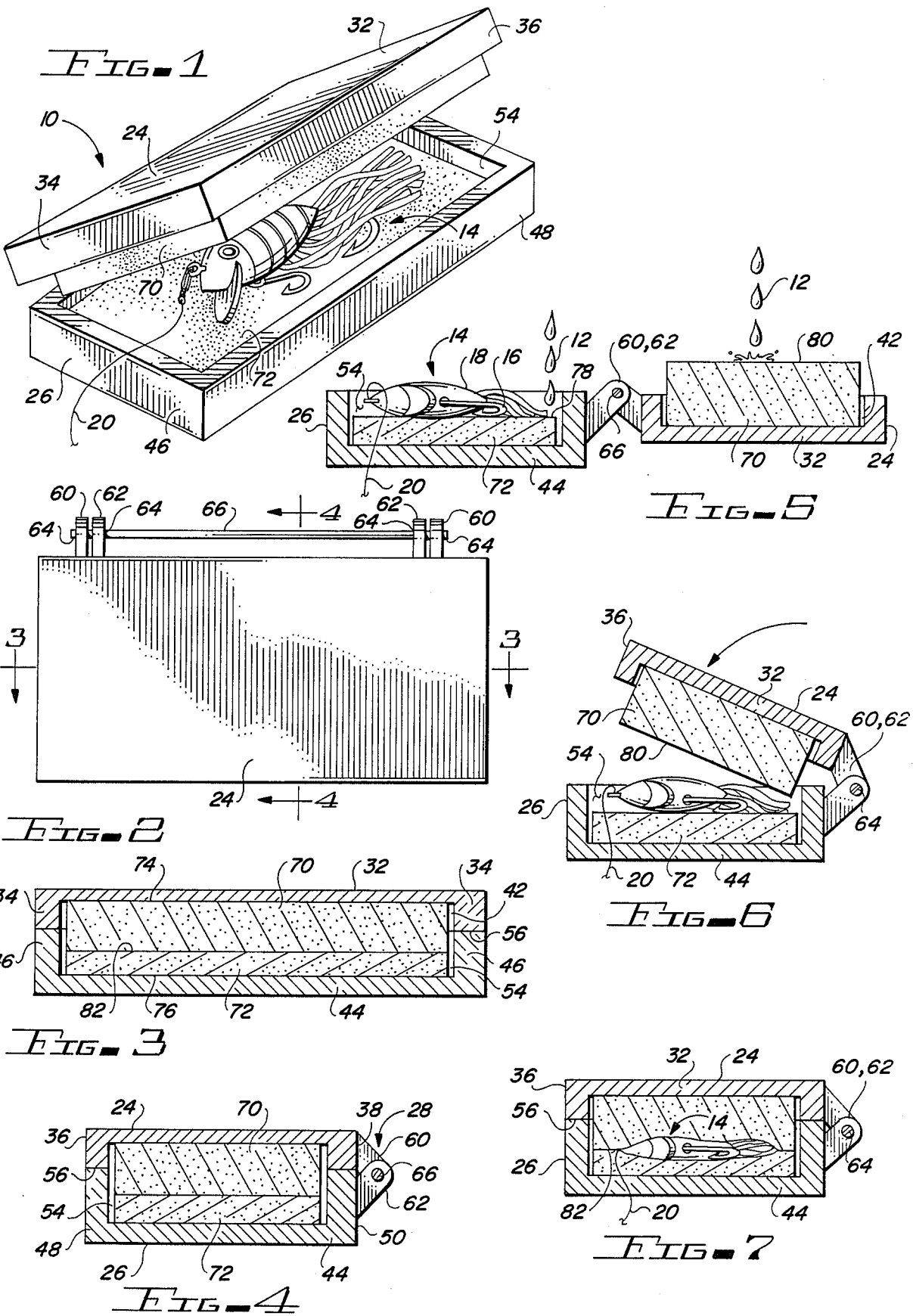

4,771,564

FISHING ACCESSORY AND METHOD OF USE

BACKGROUND OF THE INVENTION

Throughout the ages there has been a never ending battle between man and fish, sometimes for necessary food, sometime for sport. A common advantage which man has gained in this battle is in the use of the barbed hook on a fishing line to catch fish. The hook is preferably provided with bait, natural or synthetic, to entice the fish to the hook and to bite it and thus become caught. The hook, bait and line together make up the tackle. Man has continually improved his advantage by designing more attractive and enticing bait or lures. It has recently been discovered, however, that many fish will not be readily attracted to the bait and caught by this technique due to the odor of the tackle. This applies to salt water fish as well as to fresh water fish. It has been determined that many fish will be repelled from the tackle if the smell of man is present or if an anticipated fish smell is not present on the tackle. Consequently, there has recently been developed a fluid which may be dispensed onto the tackle or lure to overcome this problem. The fluid is basically formulated from the oil of fish, preferably with preservatives or other additives. The fluid is merely dispensed in spray form from a pump cannister to provide the essence of fish and mask the human odor. The overall effect is a proven success with notably increased fishing efficiency.

Unfortunately, however, the presently available fish attracting fluid can only be applied by pumping the fluid in a spray form onto the lure. Such a technique is expensive and wasteful in that the majority of the sprayed fluid is lost to the atmosphere. Such technique also tends to coat the hands of the fisherman with such fluid which is generally considered to be of an odor unpleasant to humans.

The prior patents disclose many techniques for coating objects with a fluid or otherwise dispensing fluid onto or into an object but have not addressed the problem of dispensing fish attractants. In U.S. Pat. No. 2,914,377 to Bull, there is disclosed a method and apparatus for protecting articles by inhibiting corrosion through the use of balloons which intimately conform to the article being protected. In the patent to Martin, U.S. Pat. No. 4,034,118, a method is disclosed for sweetening or mellowing onions wherein the onions are placed in a pouch and liquid applied to the exterior of the pouch to then contact and coat the onions within the pouch. The Hessel patent, U.S. Pat. No. 4,040,515, discloses apparatus for dispensing a chemical into a fluid through a porous matrix exhibiting capillary action. The apparatus is intended for use in air conditioners and the like. U.S. Pat. No. 4,240,240 to Cohen discloses a method of making a package having foam inserts, top and bottom, the foam being cut to provide opposed foam surfaces for contacting the article being packaged. Lastly, U.S. Pat. No. 4,275,811 to Miller discloses a receptacle for containing and displaying food products. The products rest on a mat or mats of liquid absorbent material. As can be seen from the prior patents, there is no disclosure, teaching or suggestion of a method or apparatus for conveniently coating fishing tackle or lures using a fluid-containing box wherein the coating is complete and intimate upon the closing and opening of the box.

It is an object of the present invention to provide an improved method and apparatus for applying fish attracting fluid to a fish lure.

It is another object of the present invention to provide a method and apparatus for applying fish attracting fluid to a fish lure which minimizes fluid waste.

It is yet a further object of the present invention to provide a method and apparatus for coating fishing tackle with a fish attracting fluid without getting such fluid on the hands of the fisherman.

SUMMARY OF THE INVENTION

The present invention comprises a fishing accessory in the form of a fluid retaining box for coating tackle with a fish attracting fluid. The box comprises, in combination, an upper portion and a lower portion, the portions being mateable and each having an opening facing each other when the box is closed; an upper segment of resilient, liquid absorbent material secured within the opening of the upper portion of the box; a lower segment of resilient, liquid absorbent material secured within the opening of the lower portion of the box, the upper and lower segments together being of thickness to contact each other when the box is closed; and hinge means secured to the box to allow the upper and lower portions to be moved toward and away from each other to close and open the box and to allow the segments, when provided with liquid, to contact and coat tackle within the box with such liquid. The depth of the upper and lower opening are essentially equal. The upper segment is thicker than the lower segment. The upper and lower portions include upper and lower plates which are parallel with each other when the box is closed and the lower plate is thicker than the upper plate. The hinge means includes a pair of apertured brackets extending from the upper and lower portions and a hinge pin extending through the apertures. The upper and lower segments contact each other along a parting line when the box is closed and the axis of the hinge pin is in the plane containing the parting line. The upper and lower segments contact each other in a plane parallel with, but offset beneath, the plane containing the parting line and the axis of the hinge pin when the box is closed. The upper and lower portions are formed of a molded polymer. The upper and lower segments are formed of an open cell polyurethane foam polymer.

The box is opened to lie flat by separating its upper and lower portions about the attached hinge. A fish attracting fluid is dispensed on mutually contactable exposed surfaces of the resilient, absorbent segments within the openings of each portion of the box. Fishing tackle or lures are placed on the lower segment and the box is closed whereby the segments contact each other and conform to the tackle so that all of the surfaces of the tackle are contacted by, and coated with, the fluid on the segments to mask or remove the human odor on the tackle and replace it with a fish attracting odor.

BRIEF DESCRIPTION OF THE DRAWINGS

For a better understanding of the present invention, reference may be had to the following detailed description taken in conjunction with the accompanying drawings in which:

FIG. 1 is a perspective illustration of a box constructed in accordance with the principals of the present invention and showing fishing tackle in position for being coated with a fluid upon the closing of the box;

FIG. 2 is a top plan view of the box as shown in FIG. 1;

FIGS. 3 and 4 are sectional views of the box shown in FIGS. 1 and 2 taken along lines 3—3 and 4—4 of FIG. 2; and FIGS. 5, 6 and 7 are sectional views of the box shown in FIGS. 1 through 4 illustrating the closing of the box and the application of the forces and fluid onto the tackle located therein.

DETAILED DESCRIPTION

Shown in the various figures, particularly FIGS. 1 through 3, is a fishing accessory in the form of a box 10 for applying a coating of a fish attracting fluid 12 to fishing tackle 14 positioned within the box. As used herein, the term "tackle" is intended to mean the fishing hook 16, lure 18 and any attached portion of fishing line 20. The box, however, is capable of coating anything including any part or parts of the tackle so long as the box can be closed on the tackle. The box is formed of an upper portion 24 and a lower portion 26 coupled together by a hinge 28. The upper portion of the box has an upper plate 32 with downwardly depending side faces 34 and a front face 36 and back face 38. Between these faces of the upper portion is defined an upper opening 42. The lower portion of the box has a lower plate 44 with upwardly projecting side faces and a front face 48 and a back face 50. Between these lower faces is defined a lower opening 54. In the embodiment illustrated, the box is rectangular having both front and back faces are parallel and a common length. Similarly, all of the side faces of the box are parallel and of a common length which is less than the length of the front and back faces. The lengths of all the faces, side and front and back, extend to essentially a common distance from their associated plates so that the upper and lower openings are of essentially the same size and shape. The similarly shaped portions of the box will insure proper mating contact along a planar parting line 56 between the upper and lower portions when the box is closed. This parting line is in a plane which also contains the axis of the hinge 28. Other shape boxes may be used as long as they can be adequately sealed.

Projecting outwardly from the back faces 38 and 50 of the upper and lower portions are laterally spaced pairs of upper supports 60 and lower supports 62 with apertures 64. The apertures of the upper supports as well as the lower supports are aligned for receiving a hinge pin 66. The hinge pin is located in the same plane as the plane containing the parting line 56 of the upper and lower portions and functions to allow the opening of the box by the moving of the upper portion away from the lower portion and to allow the closing of the box by moving of the upper portion toward the lower portion.

The upper and lower portions of the box are provided with segments 70 and 72 of resilient, absorbent material, rectangular in shape, and configured to fit within the upper and lower openings of the box. There is approximately a ⅛ inch gap between the sides of the absorbent material and the sides of the box. The interior surfaces 74 and 76 of the resilient, absorbent segments are attached to the interior surfaces of their associated plates 32 and 44 by any known cement, adhesive or the like to assure their proper positioning and retention during operation and use. The upper segment 70 is of a thickness greater than the length of the faces depending from the upper plate. The thickness of the lower resilient, absorbent segment 72 is less than the length of the faces extending upwardly from the lower plate. The exposed surfaces 78 and 80 of the segments are both planar and, when the box is closed, contact each other within a plane 82 parallel with, but offset below, the plane containing the parting line 56 and the axis of the hinge pin 66. In this manner, as can be seen in FIGS. 5 through 7, the upper resilient, absorbent segment will enter the lower portion of the box before the box is fully closed. This will allow the fisherman to visually observe that the tackle is remaining properly positioned on the lower resilient, absorbent segment as it is beginning to be contacted by the upper resilient, absorbent segment.

The thicknesses of the upper and lower resilient, absorbent segments taken together are equal to the vertical extent of the downwardly projecting faces 34, 36 and 38 and upwardly extending faces 46, 48 and 50 of the box event though the parting line of the faces is in a plane parallel and offset above the plane between the resilient, absorbent segments.

The locating of the hinge pin laterally offset from the box will permit a relatively flat application of force from the upper resilient, absorbent segment to the lower resilient, absorbent segment and the tackle therebetween. If the hinge pin were to be located immediately at the edges of the resilient, absorbent segments and not offset, an excessive lateral component of force would be undesirably applied to the contents of the box tending to shift it away from the contacting upper and lower resilient, absorbent segments and toward the front faces of the box. While closing the box, the action of the exposed surfaces will effectively cause a rolling action of such exposed surface and the fluid onto the tackle. Preferably, the lower plate of the box is thicker than the upper plate to add weight to the lower portion of the box to make it more stable while in use.

The upper and lower portions 24 and 26 of the box are preferably formed as through molding to a relatively rigid plastic material as from a polyethylene or polyvinylchloride polymer. Other like materials could readily be utilized, and other fabrication techniques could, of course, be readily substituted. The box is rectangular in shape, preferably about 10 by 4 inches and about 1⅜ inches high. This size is to accomodate a very wide variety of fishing tackle sizes. It should be understood, however, that variations in sizes are well within the scope of the present invention. With respect to the resilient, absorbent segments 70 and 72, any selected material would have to be absorbent to receive and hold the fish attracting fluid. The fluid 12 would be held on the exposed surfaces of the segments and within the cells of the matrix of the material so as to migrate toward the exposed exterior surfaces when deformed by the tackle 14 being coated. Such selected material would also have to be resilient so that it will conform to the tackle being treated and then return to its original shape after coating in anticipation of receiving another tackle, including one of a different size, shape and configuration. The resilient, absorbent material is preferably an open cell polyurethane polymer capable of receiving a quantity of fish attracting fluid on their respective surfaces as by spraying, pouring, brushing or the like. The open cells of the segments will allow the fluid to fill the cells of the segments so that a large number of coating applications may be achieved before additional fluid would have to be applied to the segments again.

In employing the present fishing accessory to coat fishing tackle 14, the box 10 is preferably fully opened, to lie flat as shown in FIG. 5, by pivoting the upper portion 24 away from the lower portion 26. Oil attracting fluid 12 is then provided to the surfaces 78 and 80 of the exposed resilient, absorbent segments with the fluid so that, preferably, no fluid contacts the hands of the fisherman. If the box had been previously provided with fluid so that the exposed surfaces of resilient, absorbent segments are still moist, this step may be eliminated. With the box open and the resilient, absorbent segments provided with fluid, the fishing tackle is then placed on the exposed surface of the lower resilient, absorbent segment 72 with a part of the line 20 extending from the box. The box is then closed whereby the upper absorbent segment 70 would first begin to contact the lower resilient, absorbent segment 72 adjacent the interior back edge close to the hinge pin. The closing would then be continued, as shown in FIG. 6, with the tackle being sequentially contacted by the upper segment 70, with the pressure causing the greater amount of conforming deformation to occur upwardly because of the greater thickness and resiliency of the upper segment 70 and the upper plate 32 being thinner and less rigid than the lower plate 44. The closing would continue until the box is fully closed, or as much so as permitted by tackle thickness, as shown in FIG. 7, and the full tackle 14 within the box contacted and coated by the facing exterior, exposed surfaces 78 and 80 of the resilient, absorbent segments, top and bottom. Note the sequence as illustrated in FIGS. 5, 6 and 7, will insure a complete application of a thin coating of fluid on all surfaces of the tackle within the box thus eliminating or masking the human odor and replacing it with the essence of fish. Upon the opening of the box, the tackle that had been in the box would be completely prepared for fishing without the drawback of the previously known devices and methods.

While the invention has been described in what is considered to be a preferred embodiment of the invention, it will become apparent to those skilled in the art that many modifications, variations and changes in the invention are possible without departing from its true spirit. Accordingly, it is intended that the description be interpreted as illustrative and not in a limiting sense and that the invention be given a scope commensurate with the appended claims.

What is claimed is:

1. A fishing accessory in the form of a box for coating lures with a fish attracting fluid, said box comprising in combination:

an upper portion and a lower portion, said portions being mateable and each having an opening facing each other when said box is closed, said lower portion being positioned substantially in a horizontal plane with its opening facing upwardly for receiving a lure;

an upper segment of resilient, liquid absorbent open cell polyurethane material secured within said opening of said upper portion of said box;

a lower segment of resilient, liquid absorbent open cell polyurethane material secured wtihin said opening of said lower portion of said box, said upper and lower segments together being of thicknesses to contact each other when said box is closed, said upper segment being thicker than said lower segment, said upper segment contacting said lower segment below a plane of said opening of said lower portion; and hinge means secured to said box to allow said upper and lower portions to be moved toward and away from each other to close and open said box and to allow said segments, when provided with liquid, to contact and coat a lure within said box with such liquid.

2. A method for coating fishing lures with a fish attracting fluid including the steps of:

providing a liquid impervious box having mutually contactable exposed surfaces of resilient, absorbent open cell segments within openings of upper and lower hingeable portions of the box;

coating the absorbent segments with a fish attracting fluid;

placing a fishing lure on the lower segment;

closing the box whereby the segments contact each other and conform to the lure so that all of the surfaces of the lure are contacted by, and coated with, the fluid on the segments to mask or remove the human odor on the lure and replace it with a fish attracting odor; and opening the box to thereby expose the lure for use in fishing.

* * * * *